United States Patent [19]

Amano et al.

[11] Patent Number: 4,900,967
[45] Date of Patent: Feb. 13, 1990

[54] ELECTRIC MOTOR ASSEMBLY

[75] Inventors: Hiroyuki Amano, Kariya; Hiroyuki Takagi, Toyota, both of Japan

[73] Assignee: Aisin Seiki Kabushiki Kaisha, Aichi, Japan

[21] Appl. No.: 251,594

[22] Filed: Sep. 30, 1988

[30] Foreign Application Priority Data

Sep. 30, 1987 [JP] Japan ............... 62-150046[U]

[51] Int. Cl.$^4$ ............................................. H02K 13/00
[52] U.S. Cl. ............................. 310/239; 310/42; 310/89; 310/91
[58] Field of Search ............... 310/239–242, 310/244–248, 89, 91, 42, 233; 29/597

[56] References Cited

U.S. PATENT DOCUMENTS 4,398,135  8/1983  Busch et al. ............... 310/239

FOREIGN PATENT DOCUMENTS

| 2249684 | 4/1974 | Fed. Rep. of Germany ...... 310/239 |
| 0121940 | 6/1985 | Japan . |
| 0006831 | 2/1987 | Japan . |
| 88/01801 | 3/1988 | PCT Int'l Appl. .................. 310/89 |
| 2075276 | 11/1981 | United Kingdom ................ 310/239 |

Primary Examiner—R. Skudy
Attorney, Agent, or Firm—Sughrue, Mion, Zinn, Macpeak & Seas

[57] ABSTRACT

An electric motor assembly is comprised of a two-part cylindrical housing having a stepped interconnection. A circular plate is secured between the two housing portions by means of a plurality of spring clips located in peripheral recesses on said disk and having a flexible extension portion disposed in stressed engagement with one of said cylindrical housing portions to bias the plate into engagement with the stepped portion of the other cylindrical housing portion. The stator and rotor may be located on one side of the plate and a brush may be mounted on the opposite side of the plate for engagement with a commutator rotatable with the rotor.

4 Claims, 2 Drawing Sheets

ELECTRIC MOTOR ASSEMBLY

FIELD OF THE INVENTION

The present invention is directed to an electric motor assembly, and more specifically to an electric motor assembly having an improved brush mounting arrangement within the motor housing.

BACKGROUND OF THE INVENTION

Various conventional electric motor assemblies have been proposed wherein a stationary brush mounting plate is secured within the motor housing by means of screws, rivets or the like. Electric motor assemblies of this type have been disclosed in Japanese Laid Open Patent Application No. 60-121940 and Japanese Utility Model Publication No. 62-6831.

The prior electric motor assembly is shown in FIG. 8 of the present application wherein a stationary plate 3a of plastic material which supports a brush 31a is secured to the housing 2a by means of screws P passing through the outer peripheral portion 300a of the plate. Thus the brush 31a is held and maintained in the desired position relative to the commutator. However, the stationary plate 3a is very apt to be broken when a tightening force is applied to the screws P. Furthermore, the peripheral portion of the plate 3a is subjected to very high temperatures which will further weaken the plate in the vicinity of the screw connections. Due to the extra assembling steps involved in securing the plate to the housing by means of the screws, the production costs for such an electric motor assembly is rather high.

SUMMARY OF THE INVENTION

It is an object of the present invention to provide an improved electric motor assembly which obviates the above-mentioned drawbacks with respect to prior art electric motor assemblies.

It is another object of the present invention to provide an improved electric motor assembly having increased durability, is easier to assemble and is lower in cost.

BRIEF DESCRIPTION OF THE DRAWINGS

The foregoing and other objects, features and advantages of the invention will be apparent from the following more particular description of preferred embodiments of the invention as illustrated in the accompanying drawings wherein.

DETAILED DESCRIPTION OF THE INVENTION

Figure 1:
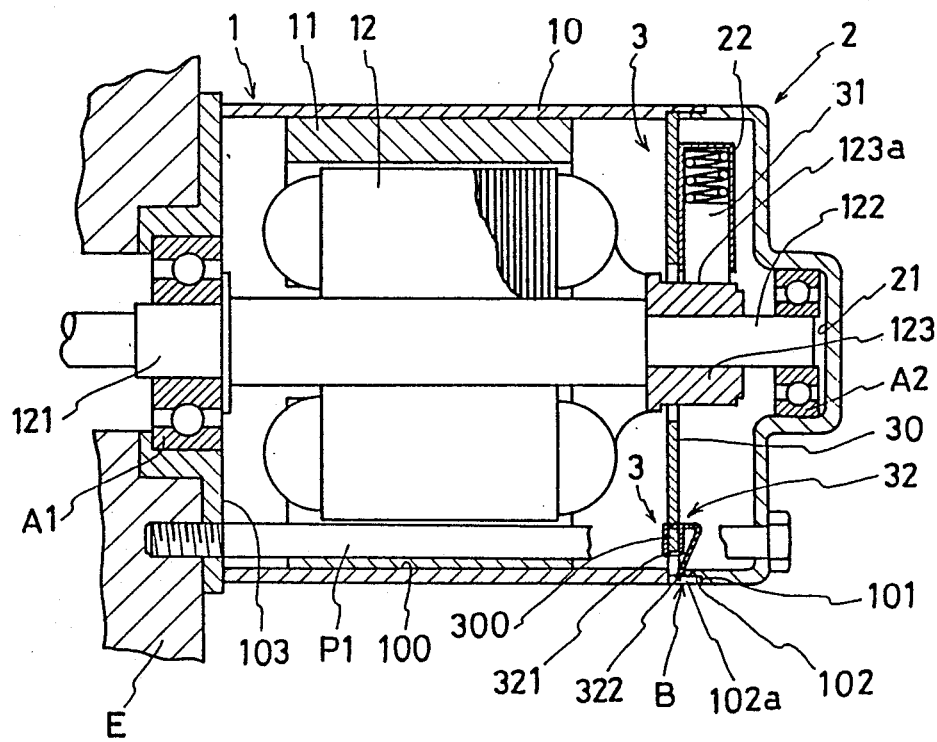
FIG. 1 is a cross-sectional view of an electric motor assembly according to the present invention.
Figure 2:
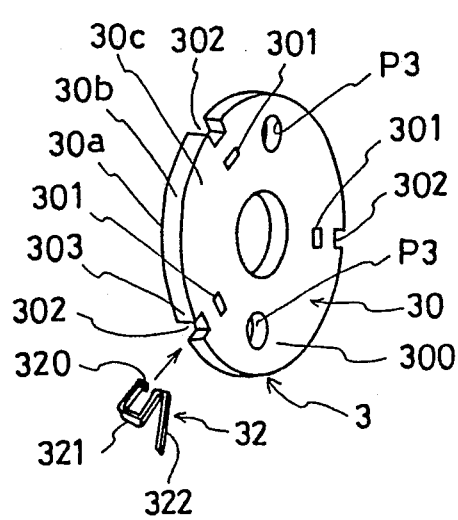
FIG. 2 is a perspective view of the brush mounting plate and locating spring in spaced relation to each other.

Referring to the first embodiment of the present invention as illustrated in FIG. 1, the electric motor assembly includes a housing comprised of a first part 1, a second part 2 securely inserted within a large diameter step portion 102 provided at the right end of the first part 1 as viewed in FIG. 1, and a third part 103 secured to the left end of the first part 1. The third part 103 which has a bearing A1 fitted therein may be formed of integral one-piece construction with the first part 1 of the housing. A stator 11 is secured onto the inner surface 100 of the cylindrical portion 10 of the first housing part 1. The large diameter stepped portion 102 is provided with axially extending guide grooves 102a which limit circumferential movement of the reverse engaging bent end portion 322 of spring clips 32, respectively, which will be described in detail hereinafter.

The second housing part 2 includes a convex portion 21 having a bearing A2 fitted therein and an extension 101 which is positioned within the large diameter step portion 102 of the first housing part 1 to thereby provide a connection portion B. The opposite ends 121 and 122 of a shaft for the rotor 12 are rotatably supported in the bearings A1 and A2, respectively.

The stationary plate 3 is inserted within the stepped portion 102 of the first housing part 1 and a brush holder 22 is mounted on the face of the plate 3 opposite the rotor 12. The brush 31 is located within the brush holder 22 and is biased radially inwardly by means of a spring within the brush holder 22 against the outer surface 123a of a commutator 123 mounted for rotation with the shaft end 122.

Figure 3:
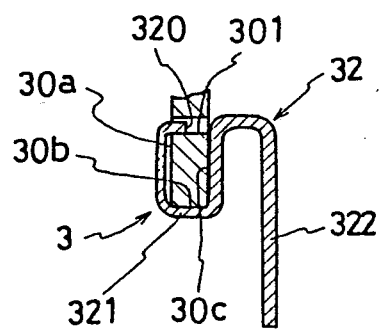
FIG. 3 is an enlarged cross-sectional view showing the locating spring secured to the periphery of the brush supporting plate.
Figure 4:
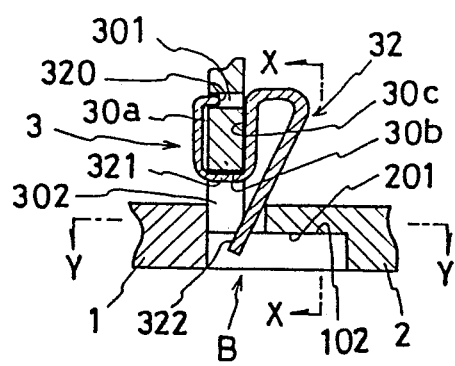
FIG. 4 is a view similar to FIG. 3 showing the brush supporting plate and locating spring assembled relative to the housing of the electric motor assembly.
Figure 5:
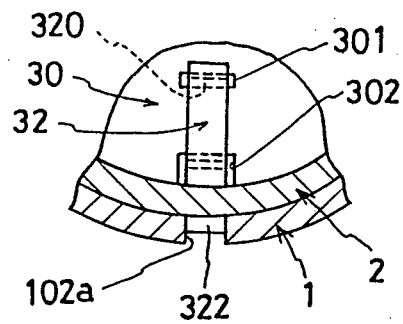
FIG. 5 is a sectional view taken along the line X—X of FIG. 4.
Figure 6:
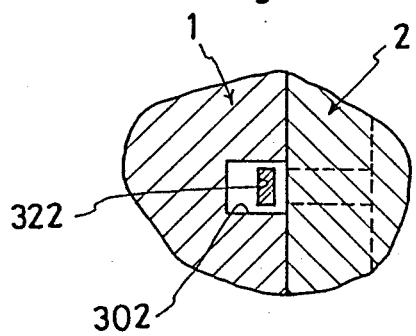
FIG. 6 is a sectional view taken along the line Y—Y of FIG. 4.

The stationary plate 3 is comprised of a base plate 30 and is axially secured within the stepped portion 102 by means of three spring clips 32 which are engaged in equally spaced peripheral recesses 302 on the plate 30. Three circumferentially located openings 301 are provided radially inwardly of each concave recess 302 respectively. Each spring clip 32 is formed by bending an elongated elastic member into the configuration as shown in FIG. 3. Each spring clip 32 is provided with an axially extending end portion 320 adapted to be received in opening 301. The end portion 320 is connected to a U-shaped intermediate portion 321 which extends through the recess 302 and engages opposite sides 30a and 30c of the plate 30 between the opening 301 and the recess 302. The reverse bent end portion 322 is connected to the U-shaped portion 321 and extends radially outwardly beyond the periphery of the plate 30. The reverse bent end portion 322 of the spring clip 32 having an R-configuration extends into an axially guide groove 102a and is held therein by means of the end surface of the second housing part 2 as best seen in FIG. 4 so as to impart a spring biasing force to the plate 30 to hold the peripheral portion 30b of the plate 30 in the stepped portion of the housing part 1. The first and second housing parts 1 and 2 are secured together by means of bolts P1 which extend through apertures in the second housing part 2, apertures P3 in the plate 30 and apertures in the third housing part 103 into threaded engagement with a support E. Thus the plate 30 with the brush mounted thereon will be securely held in its axial position within the housing.

Figure 8:
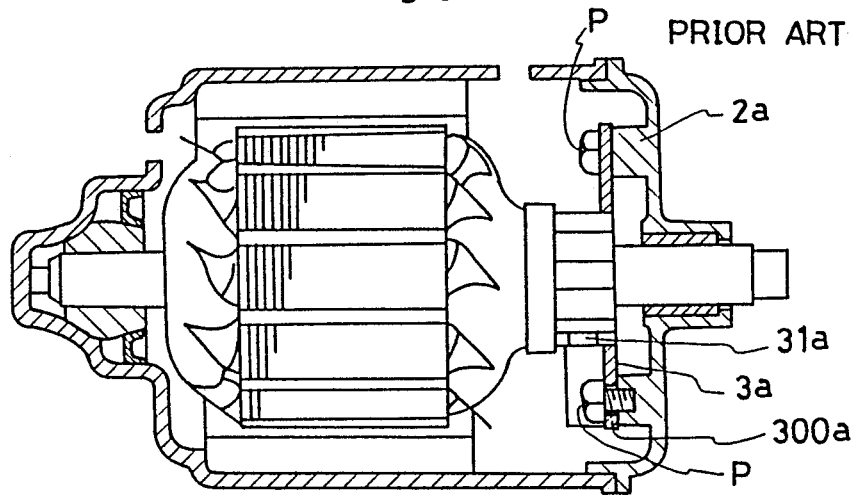
FIG. 8 is a view similar to FIG. 1 showing a prior art electric motor assembly.

In positioning the stationary plate 3 within the housing the peripheral portion 300 thereof is not subjected to any undue stress as would be caused by the penetration of the plate by means of screws or the like as in the prior art embodiment shown in FIG. 8. The number of recesses 302 and openings 301 may be varied as well as the number of bolts P1 for securing a housing together.

Figure 7:
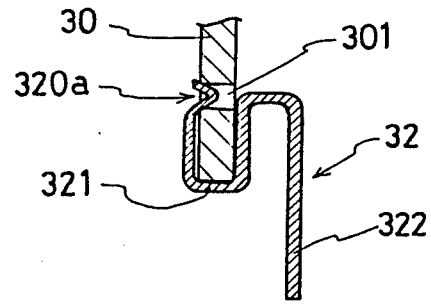
FIG. 7 is a view similar to FIG. 3, but showing a modified form of locating spring.

The second embodiment of the present invention as shown in FIG. 7 wherein the same reference numbers denote parts similar to those in the first embodiment. The end portion 320a of each spring clip 32 is provided with a reversely bent portion so that upon placement of the spring clip over the periphery of the plate 30 a rounded surface of the end portion 320a will slide along a surface of the plate to prevent damage to the plate 30. This is especially important if the plate 30 is made of plastic material.

While the invention has been particularly shown and described with reference to preferred embodiments thereof, it will be understood by those in the art that the foregoing and other changes in form and detail may be made therein without departing from the spirit and scope of the invention.

What is claimed is:

1. An electric motor assembly comprising housing means having first and second substantially cylindrical parts provided with stepped end portions connected in an interfitting circumferentially extending stepped connection, stator means secured within said housing means, rotor means rotatably supported in said housing means, a stationary base plate having a circumferential portion with circumferential concave recesses disposed intermediate the stepped end portions of said first and second substantially cylindrical parts in axial engagement with one of said first and second substantially cylindrical parts, spring means having intermediate portions mounted in said recesses between said plate and the other of said first and second substantially cylindrical parts and having end portions engaging said housing means for biasing said plate into engagement with said one of said first and second substantially cylindrical parts, and brush means mounted on said plate for engagement with commutator means carried by said motor assembly.

2. A motor device as claimed in claim 1 wherein said intermediate portions of said spring means are of approximately U-shaped configuration.

3. A motor device as claimed in claim 1 wherein said spring means is comprised of an elongated bent elastic member.

4. A motor device as claimed in claim 1 wherein said end portions of said spring means have R-configuration.

* * * * *